United States Patent
Kato et al.

(10) Patent No.: US 7,092,512 B2
(45) Date of Patent: Aug. 15, 2006

(54) CALL CONTROL DEVICE AND CALL CONTROL METHOD

(75) Inventors: Makoto Kato, Kyoto (JP); Masahiko Hashimoto, Shijonawate (JP)

(73) Assignee: Matsushita Electric Industrial Co., LTD, Osaka (JP)

(*) Notice: Subject to any disclaimer, the term of this patent is extended or adjusted under 35 U.S.C. 154(b) by 106 days.

(21) Appl. No.: 10/510,636

(22) PCT Filed: Apr. 9, 2003

(86) PCT No.: PCT/JP03/04473

§ 371 (c)(1),
(2), (4) Date: Oct. 8, 2004

(87) PCT Pub. No.: WO03/085939

PCT Pub. Date: Oct. 16, 2003

(65) Prior Publication Data

US 2005/0141696 A1    Jun. 30, 2005

(30) Foreign Application Priority Data

Apr. 10, 2002  (JP) .............................. 2002-107609

(51) Int. Cl.
*H04M 1/00*    (2006.01)

(52) U.S. Cl. .............. 379/387.01; 379/382; 455/550.1; 455/569.1; 455/575.1; 381/71.6; 600/559

(58) Field of Classification Search ............ 455/575.1, 455/550.1, 569.1; 381/71.6; 600/559; 379/387.01; 39/382

See application file for complete search history.

(56) References Cited

U.S. PATENT DOCUMENTS

| | | | |
|---|---|---|---|
| 5,884,156 A * | 3/1999 | Gordon | 455/552.1 |
| 6,154,538 A | 11/2000 | Nakano | |
| 6,639,987 B1* | 10/2003 | McIntosh | 381/71.6 |
| 6,853,850 B1* | 2/2005 | Shim et al. | 455/550.1 |
| 6,925,296 B1* | 8/2005 | Mattisson | 455/569.1 |
| 7,010,098 B1* | 3/2006 | Moquin et al. | 455/569.1 |
| 2003/0064732 A1* | 4/2003 | McDowell et al. | 455/456 |
| 2005/0221792 A1* | 10/2005 | Mattisson | 455/355 |

FOREIGN PATENT DOCUMENTS

| | | |
|---|---|---|
| JP | 4-94842 | 8/1992 |
| JP | 4-354234 | 12/1992 |
| JP | 6-46123 | 2/1994 |
| JP | 10-327225 | 12/1998 |
| JP | 2001-36640 | 2/2001 |

* cited by examiner

*Primary Examiner*—Jefferey F. Harold
(74) *Attorney, Agent, or Firm*—Wenderoth, Lind & Ponack, L.L.P.

(57) ABSTRACT

An object of this invention is to provide a method and a device for easily connecting and disconnecting a telephone communication line using an auditory organ instead of using a complex mechanism component. A distance between a speaker and the auditory organ of a telephone call receiver or a telephone call transmitter is detected using acoustic impedance and reflective wave properties of the auditory organ of the telephone call receiver or the telephone call transmitter to control call operations such as connection and/or disconnection of a communication line.

11 Claims, 10 Drawing Sheets

THIS DISTANCE VARIED
(500mm、5mm、0mm)

CALL CONTROL DEVICE AND CALL CONTROL METHOD

TECHNICAL FIELD

The present invention relates to call control devices and call control methods which are employed when a telephone call receiver or a telephone call transmitter uses a telephone set, for example, a communication line connection/disconnection device and a communication line connection/disconnection method.

BACKGROUND ART

Conventionally, for connection or disconnection of a communication line of a telephone, means have been employed such as a hook-type device for a fixed telephone set and switching of a call button for a portable telephone set. However, there have been issues such that the hook-type device restricts a design-property of a telephone set and that the call button type confounds the operation of a telephone set.

The recent spread of portable telephones sees the issues of the switch-type method such that a communication line is not disconnected owing to carelessness, and that a malfunction occurs in a call button or other buttons of a portable telephone in a pocket or in a bag without a user's intent. Particularly, the malfunction of a call button is problematic.

Correspondingly, a cordless telephone set is described in Japanese unexamined Utility Model Publication No. 04-94842 which is provided with a switch for switching according to the movement of an ear pad and a detection circuit for detecting the switching, so as to make connection to a communication line only by pressing an ear into a receiver to allow the operation to be simplified.

A personal wireless portable telephone communication device is described in Japanese unexamined Patent Publication No. 06-46123 which contains a range detection device for detecting the distance between a receiver and its user's ear having an infrared photodetector for detecting an infrared source and the reflected light thereof. This is the technology that when the distance between a receiver and its user's ear is detected as shorter than an arbitrary threshold value, the receiver operates in a hand-held receiver mode, and that when the distance is detected as longer than the arbitrary threshold value, the receiver operates in an open-type loudspeaker mode. This gazette describes that other distance measurement systems such as an acoustic echo system are applicable instead of infrared light.

However, the invention described in Japanese unexamined Utility Model Publication No. 04-94842 arranges a plurality of movable mechanism components such as an ear pad and a switch, and consequently, is disadvantageous in that a cordless telephone device becomes more complex with the mechanism components.

Furthermore, the invention described in Japanese unexamined Patent Publication No. 06-46123 is disadvantageous in the following points. The distance between a receiver and its user's ear is detected by measuring the illuminance or intensity of reflected light; however, light is reflected even when all substances including human tissue other than an ear, paper, metal, plastic, ceramics, and biological tissue approach a receiver. When the reflectivity of a relevant substance is lower than the reflectivity of an ear, a malfunction does not occur; however, when a substance having higher reflectivity than an ear (for example, glasses and earrings) exists adjacent to an ear and gradually approaches a receiver from a long distance, there is a possibility that the malfunction of the recognition that the substance is close by a receiver occurs at a distance position longer than a prescribed threshold value. This malfunction similarly occurs when a detection means, even which might even be sound, approaches a substance of some kind.

Thus, the method for finding a distance based on the illuminance or intensity of reflected light or reflected sound has to determine the distance based only on information of the external surface of a substance, and consequently, a malfunction tends to occur. In order to avoid this, it is preferable to employ a judgment criterion which considers the structure and materials inside a living body as well.

Taking the above factors into consideration, an objective of the present invention is to provide a call control device and a call control method therefor, which easily allow a telephone call to be controlled using an auditory organ, which every human has, without a complex mechanism component.

DISCLOSURE OF INVENTION

In order to achieve the above objectives, the present invention is structured as follows.

In order to solve the above issues, the present invention provides a call control method and a call control device therefor which detect a distance between the auditory organ and a sound transmission and reception part by using acoustic characteristics of the auditory organ of a telephone call receiver or a telephone call transmitter, and thus connect and/or disconnect a communication line.

That is, according to the present invention, there is provided a call control method comprising of:

transmitting sound from a sound transmission and reception section of a call control device and receiving the sound in the sound transmission and reception section;

detecting bioacoustic characteristic information of an auditory organ of a telephone call receiver or a telephone call transmitter by the received sound; and controlling call operation of the call control device based on the detected bioacoustic characteristic information.

According to the present invention, there is provided a call control device comprising:

a sound transmission and reception part for transmitting and receiving sound; and a bioacoustic characteristic information detection means for detecting bioacoustic characteristic information of the auditory organ of the operator of the call control device by the sound transmitted and received by the sound transmission and reception part, wherein call operation is controlled based on the bioacoustic characteristic information detected by the bioacoustic characteristic information detection means.

As a result, it becomes possible to automatically determine a user's situation so as to connect or disconnect a telephone line. Malfunction in a call button is also prevented by the application to a portable telephone set.

Furthermore, malfunction can be prevented when a receiver is shifted from the right ear to the left ear, for example, by detecting not only distance information but also time information to connect and/or disconnect a communication line. As acoustic informations, acoustic impedance and reflective wave properties can be employed for the acoustic characteristics of an auditory organ.

The present invention is a communication line connection/disconnection device which is further provided with a means for measuring the acoustic characteristic information of the auditory organ of a telephone call receiver or a telephone call transmitter having a speaker and a signal processing section for signal-processing the information of received and transmitted sounds, and a means for detecting the distance between the auditory organ of the telephone call receiver or the telephone call transmitter and the speaker based on the measured acoustic characteristic information.

The device is further provided with a means for detecting a distance between the auditory organ and the speaker by comparing the measured acoustic characteristic information of the auditory organ of the telephone call receiver or the telephone call transmitter with a preliminarily obtained threshold value, so as to connect and/or disconnect a communication line according to the detected distance.

As a speaker, a piezoelectric element and a voice coil can be employed.

This invention allows an easy-to-use communication line connection/disconnection method and communication line connection/disconnection device to be achieved without using a complex mechanism component.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
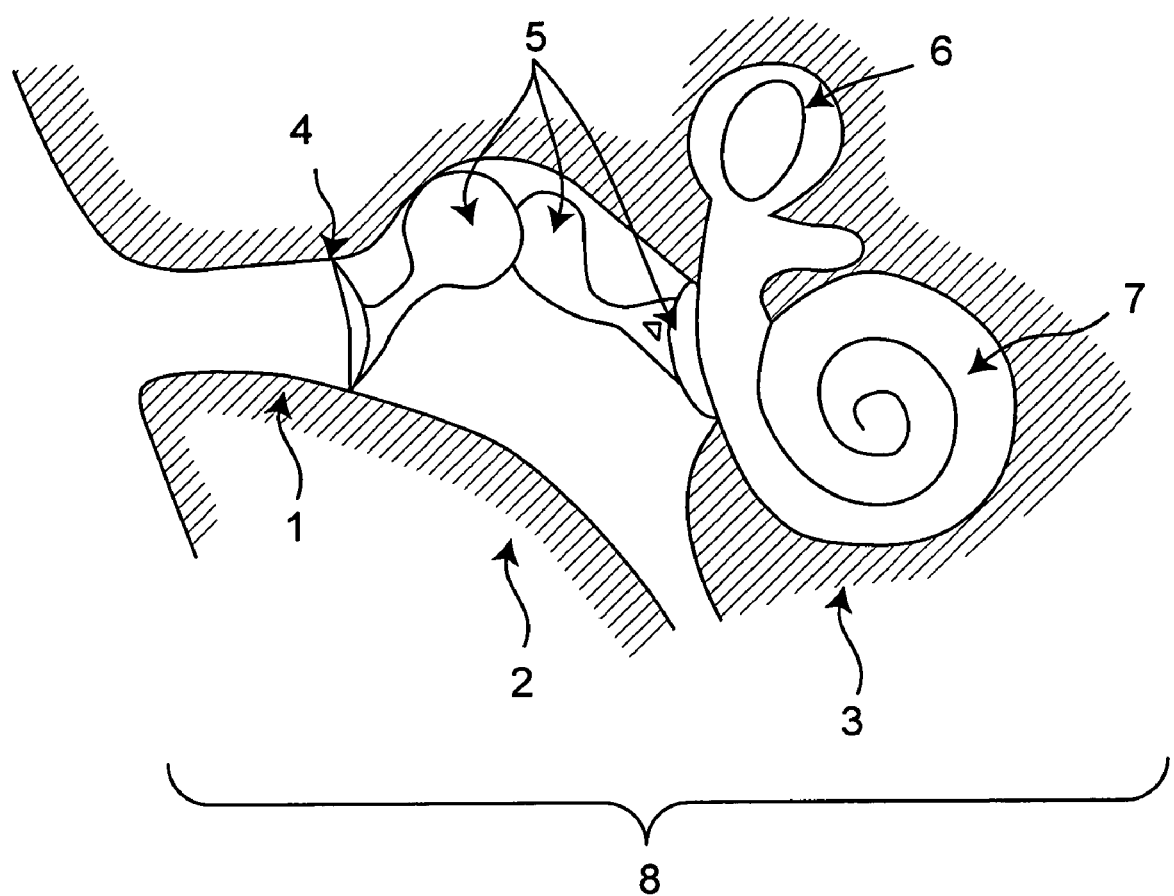
FIG. 1 shows a schematic diagram of an auditory organ according to a first embodiment of the present invention.

Before the description of the present invention proceeds, it is to be noted that like parts are designated by like reference numerals throughout the accompanying drawings.

According to a first aspect of the present invention, there is provided a call control method comprising of:

transmitting sound from a sound transmission and reception section of a call control device and receiving the sound in the sound transmission and reception section;

detecting bioacoustic characteristic information of an auditory organ of a telephone call receiver or a telephone call transmitter by the received sound; and controlling call operation of the call control device based on the detected bioacoustic characteristic information.

According to a second aspect of the present invention, there is provided a the call control method as set forth in the first aspect, comprising of:

detecting a distance between the auditory organ of the telephone call receiver or the telephone call transmitter and the sound transmission and reception section of the call control device based on the detected bioacoustic characteristic information; and controlling the operation to connect or disconnect a communication line by the call control device based on the detected distance.

According to a third aspect of the present invention, there is provided the call control method as set forth in the first aspect, wherein the bioacoustic characteristic information of the auditory organ is a total acoustic impedance of an acoustic impedance of an external ear, an acoustic impedance of a middle ear, and an acoustic impedance of an internal ear of an operator of the call control device.

According to a fourth aspect of the present invention, there is provided the call control method as set forth in any one of the 1st through 3rd aspects, wherein time information as well as the bioacoustic characteristic information or the distance information are detected and the communication line is connected or disconnected based on the detected bioacoustic characteristic information or distance information and the time information.

According to a fifth aspect of the present invention, there is provided the call control method as set forth in any one of the first through third aspects, wherein when the call operation control of the call control device is performed based on the detected bioacoustic characteristic information, voice recognition operation is controlled based on the detected bioacoustic characteristic information, as well as the communication line is connected or disconnected, and call-related operation is conducted through the voice recognition operation.

According to a sixth aspect of the present invention, there is provided a call control device comprising:

a sound transmission and reception part for transmitting and receiving sound; and a bioacoustic characteristic information detection means for detecting bioacoustic characteristic information of the auditory organ of the operator of the call control device by the sound transmitted and received by the sound transmission and reception part, wherein call operation is controlled based on the bioacoustic characteristic information detected by the bioacoustic characteristic information detection means.

According to a seventh aspect of the present invention, there is provided the call control device as set forth in the sixth aspect, further comprising a means for detecting a distance between the auditory organ and the transmission and reception section by comparing the acoustic characteristic information detected by the bioacoustic characteristic information detection means and a preliminarily obtained threshold value, wherein the communication line is connected and/or disconnected according to the detected distance.

According to an eighth aspect of the present invention, there is provided the call control device as set forth in the sixth aspect, wherein the transmission and reception section is a speaker; and the bioacoustic characteristic information detection means is a signal processing section for signal-processing the sound information received and transmitted by the speaker to detect the bioacoustic characteristic information of the auditory organ of the operator of the call control device, further comprising a distance detection means for detecting the distance between the auditory organ of the telephone call receiver or the telephone call transmitter and the speaker based on the detected bioacoustic characteristic information, wherein the call operation is controlled based on the distance detected by the distance detection means.

According to a ninth aspect of the present invention, there is provided the call control device as set forth in any one of the sixth through eighth aspects, wherein the transmission and reception section is composed of a piezoelectric element.

According to a tenth aspect of the present invention, there is provided the call control device as set forth in any one of the sixth through eighth aspects, wherein the transmission and reception section is composed of a voice coil.

According to an 11th aspect of the present invention, there is provided the call control device as set forth in any one of the sixth through eighth aspects, further comprising a voice recognition control section for controlling call-related operation by voice recognition, wherein when the distance between the transmission and reception section and the auditory organ is determined to be equal to or shorter than a preset value by the bioacoustic characteristic information detection means, voice recognition operation is started in the voice recognition control section to control the call-related operation.

This invention will be described in further detail by way of preferred embodiments with reference to the accompanying drawings.

FIRST EMBODIMENT

FIG. 1 shows a schematic diagram of a human auditory organ. In FIG. 1, reference numeral 1 denotes an external ear, 2 denotes a middle ear, 3 denotes an internal ear, 4 denotes an eardrum, 5 denotes an auditory ossicle, 6 denotes semicircular canal, 7 denotes a cochlea, 8 denotes an auditory organ, respectively. The auditory organ 8 is composed of the external ear 1, the middle ear 2, and the internal ear 3, and the acoustic characteristic information of the auditory organ, acoustic impedance in particular, that is, the total acoustic impedance of the acoustic impedance of the external ear 1, the acoustic impedance of the middle ear 2, and the acoustic impedance of the internal ear 3 shows characteristics particular to a human auditory organ.

Figure 2A:
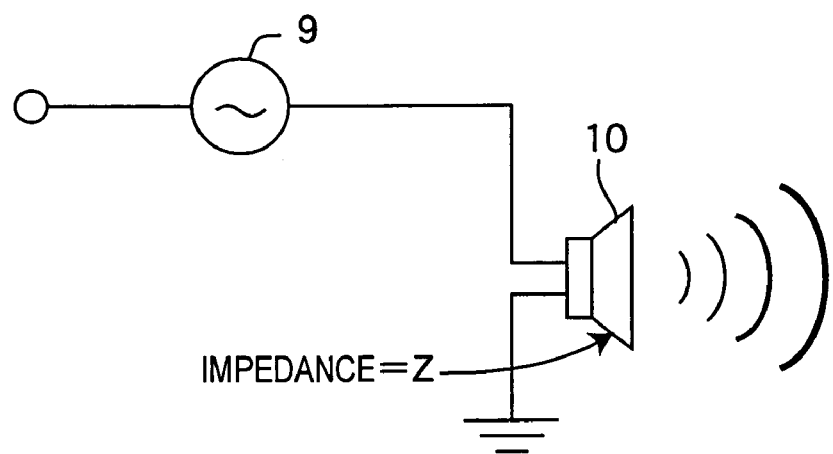
FIG. 2A and FIG. 2B are schematic diagrams showing change in electrical impedance of a speaker which is mounted with a receiver connected to a communication line connection device as an example of a call control device according to the first embodiment of the present invention.
Figure 2B:
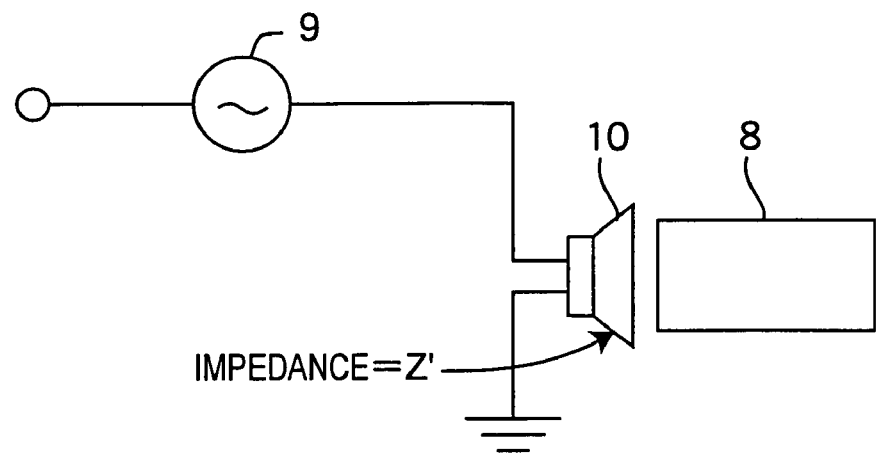

FIG. 2A and FIG. 2B are schematic diagrams showing change in electrical impedance of the speaker which is mounted with a receiver connected to a communication line connection device as an example of a call control device according to the first embodiment of the present invention. Reference numeral 9 denotes a power source and 10 denotes a speaker, respectively. The electrical impedance of the speaker 10 is measured by a signal processing section 13 (see FIG. 4A, FIG. 4B and FIG. 5). FIG. 2A shows a situation in which the speaker 10 transmits sound in open space (in other words, a situation in which the receiver is not being used) and FIG. 2B shows a situation in which the speaker 10 transmits sound with the speaker 10 being adjoined to the auditory organ 8 (in other words, a situation in which the receiver is being used.

As shown in FIG. 2A, when the speaker 10 transmits sound in open space, this electrical impedance of the speaker 10 is set as Z. When the auditory organ 8 is adjoined to the speaker 10 as shown in FIG. 2B, the acoustic impedance of the auditory organ 8 and the electrical impedance of the speaker 10 combine with each other through air with the result that the electrical impedance of the speaker 10 changes from Z to Z'. The degree of change in the electrical impedance Z of the speaker 10 differs according to the degree of combination between both of the impedances. Since this degree of change is dependent on the distance between the auditory organ 8 and the speaker 10, the distance between the auditory organ 8 and the speaker 10 can be detected if the electrical impedance Z, which is acoustic characteristic information, is measured. When the signal processing section 13 (see FIG. 4A, FIG. 4B and FIG. 5) determines that the detected distance has become shorter than a preset distance, the signal processing section 13 connects a communication line of a telephone.

Hereinafter, this will be described in further detail using an equivalent circuit.

Figure 3:
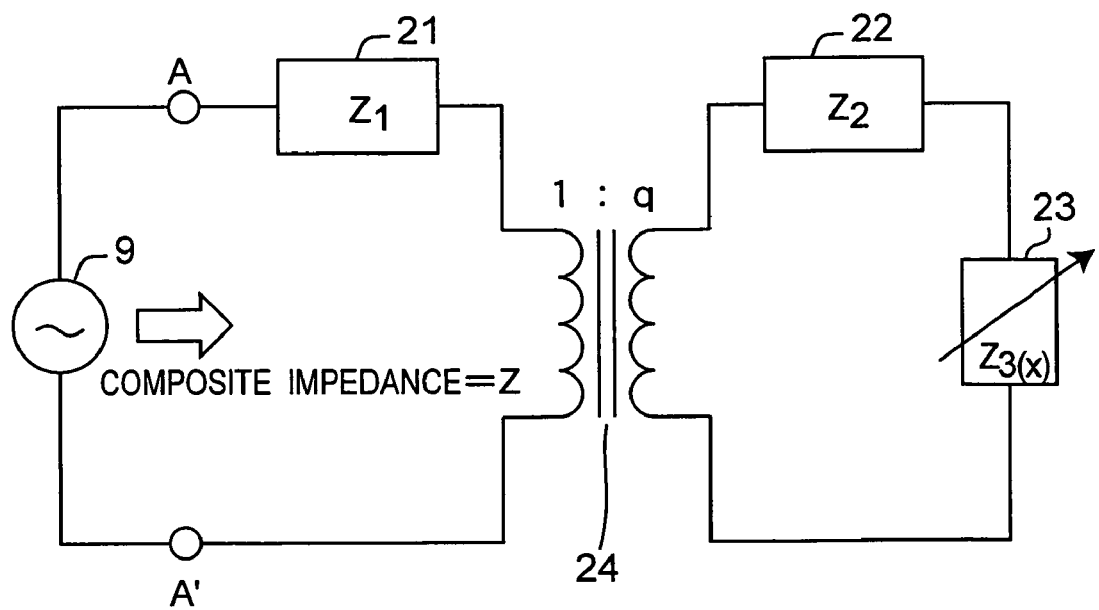
FIG. 3 shows an equivalent circuit diagram of a receiver which is connected to the call control device of FIG. 2A and FIG. 2B according to the first embodiment of the present invention.

FIG. 3 shows an equivalent circuit diagram of the receiver which is connected to the communication line connection device of FIG. 2A and FIG. 2B. Reference numeral 9 denotes a power source, 21 denotes an electrical impedance having a value of $z_1$, 22 denotes an acoustic impedance having a value of $z_2$, 23 denotes a variable acoustic impedance having a value of $z_3$ (x), and 24 denotes a transformer which combines an electrical system and an acoustic system (mainly formed by air), respectively.

First, the operation of the variable acoustic impedance 23 will be described.

The variable acoustic impedance 23 is a function of the distance x between the auditory organ 8 and the speaker 10. When the speaker 10 transmits sound in open space as shown in FIG. 2A, that is, when the distance x indicates a large value, the value $z_3$ (x) is then considered zero.

When the speaker 10 being adjoined to the auditory organ 8 transmits sound as shown in FIG. 2B, that is, when the distance x indicates the minimum value, the equation $z_3$ (x)=$z_3$max is valid.

For example, when a calling party brings the speaker 10 from the situation in which the speaker 10 transmits sound in open space, gradually closer to the auditory organ 8, and finally on contact with the auditory organ 8, the value of $z_3$ (x) varies continuously from zero and reaches its maximum at $z_3$max.

Next, a composite impedance Z on the equivalent circuit will be described.

The equivalent circuit shown in FIG. 3 has a primary circuit, that is, the circuit to the left of the transformer 24, which is an electrical system circuit, and the circuit to the right thereof is a secondary circuit, which is an acoustic system circuit.

In the equivalent circuit of FIG. 3, the acoustic impedance $z_2+z_3$ (x) of the secondary circuit is considered as the electrical impedance $z_t$ (x) via the transformer 24 from the standpoint of the primary circuit, and when the transformation ratio of the transformer 24 is set as (the primary side: the secondary side=1:q), the value $z_t=(z_2+z_3)/(q \times q)$ is obtained. That is, the composite electrical impedance Z(x) to the right of A–A' in the equivalent circuit is indicated as the sum of the value $z_1$, which an electrical impedance 21 has, and the $z_t$ (x), and the following Equation (1) is established.

$$Z(x) = z_1 + z_t(x) = z_1 + \frac{1}{q^2}[z_2 + z_3(x)], \quad (1)$$

Referring now to change in value of electrical impedance. The composite electrical impedance Z varies continuously from $Z\min = z_1 + z_2/(q \times q)$ to $Z\max = z_1 + (z_2 + z_3\max)/(q \times q)$ by bringing the speaker 10 closer to the auditory organ 8 gradually. This means that the distance between the auditory organ 8 and the speaker 10 can be detected if the electrical impedance Z is measured. When the signal processing section 13 (see FIG. 4A, FIG. 4B and FIG. 5) determines that the detected distance has become shorter than a distance (a threshold value) which is preset and stored in a memory section 31 (see FIG. 5), a communication line connection/disconnection section 32 connects a telephone communication line, as will be described in detail later.

Figure 7:
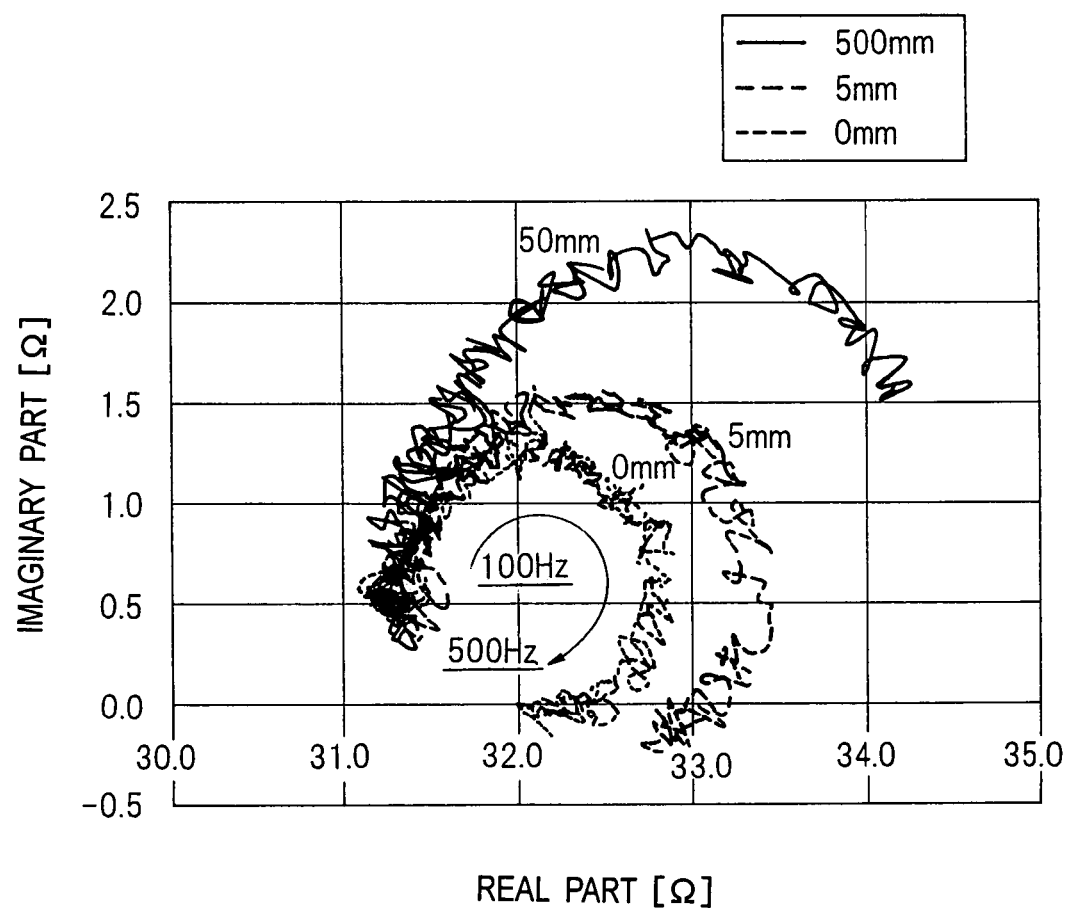
FIG. 7 is a graph showing an experiment result indicating change in the electrical impedance of the speaker when the distance between the auditory organ and the speaker varies in the communication line connection device of the first embodiment of the present invention.
Figure 8:
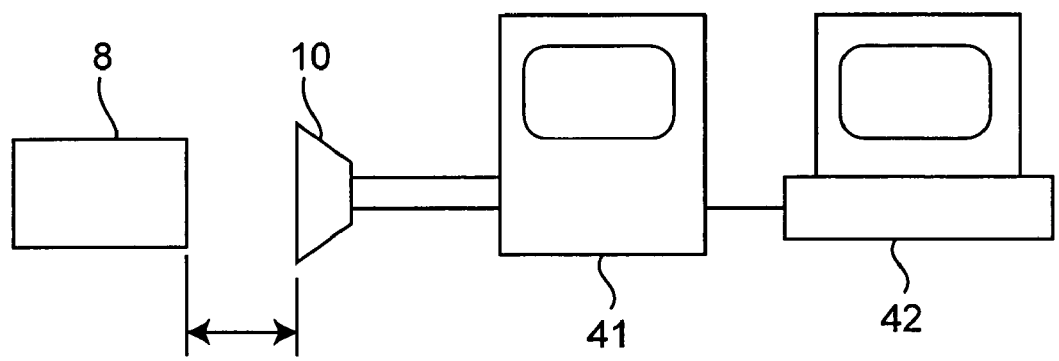
FIG. 8 shows a schematic diagram of an electrical impedance measurement system of the speaker according to the communication line connection device of the first embodiment of the present invention.

FIG. 7 shows a state of change in the electrical impedance of the speaker 10 when the distance between the auditory organ 8 and the speaker 10 of the communication line connection device varies. A measurement was conducted in the system shown in FIG. 8. The speaker 10 was connected to an impedance analyzer 41 (4194A produced by Hewlett-Packard Co.), the frequency of the alternating voltage (amplitude 0.5V) applied to the speaker 10 was swept from 100 Hz to 500 Hz, the change in the electrical impedance of the speaker 10 on the moment was measured by the impedance analyzer 41 and recorded in a personal computer 42. The measurement was conducted on the three distances of 500 mm, 5 mm, and 0 mm between the auditory organ 8 and the speaker 10.

As shown in FIG. 7, the impedance difference due to the difference of the distance is rarely found in 100 Hz, whereas the impedance difference is recognized as a remarkable difference in 500 Hz. That is, the distance between the auditory organ 8 and the speaker 10 can be measured by measuring the electrical impedance of the speaker 10 in a frequency of 500 Hz.

Since electrical impedance is a complex number, the two parameters of the real part and the imaginary part vary according to changes in the distance between the auditory organ 8 and the speaker 10. Consequently, the comparison operation of vector quantity is required to conduct distance calculation for setting a threshold value and for detecting distance, and after obtaining the absolute value of the vector indicating electrical impedance Z, the absolute value is preferably compared with a threshold value for the purpose making the operation easier.

Figure 5:
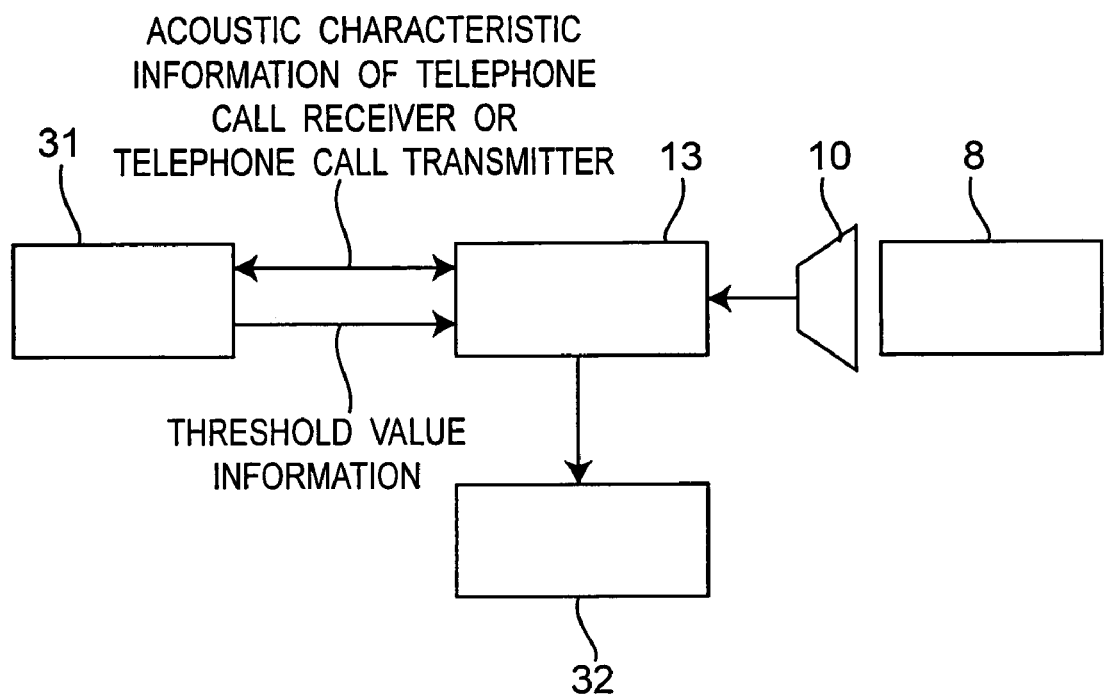
FIG. 5 shows a schematic diagram of the communication line connection device of the first embodiment of the present invention.

In order to determine whether a telephone communication line is connected or not, a comparison is made between the distance between the auditory organ 8 and the speaker 10 which is obtained from the electrical impedance measured and stored in the memory section 31 (see FIG. 5) and the threshold value which is preset and stored in the memory section 31 (see FIG. 5). This threshold value may be obtained from an average acoustic impedance value of the human auditory organ 8. However, since the auditory organ 8 differs in individuals, it is particularly preferable that before using the communication line connection/disconnection function, a user preliminarily measures the relation between the electrical impedance Z (x) and the distance x to store it in the memory section 31 (see FIG. 5), using the user's auditory organ 8.

Although the above example relates to the case in which the threshold value to be compared with the distance between the auditory organ 8 and the speaker 10 is a parameter having a length dimension, it is preferable, needless to say, that the electrical impedance Z may be employed as a threshold value directly instead of obtaining distance from the electrical impedance Z. In this case, connection for a call (or connection/disconnection as will hereinafter be described in detail) is determined by storing the electrical impedance Z in the memory section 31 (see FIG. 5) as it is and comparing the impedances in the signal processing section 13.

As described above, a communication line is easily connected by utilizing the acoustic impedance of the auditory organ 8, but the description will be given for the case in which a communication line is disconnected in contrast.

If the signal processing section 13 is set to disconnect the communication line immediately when the signal processing section 13 determines that the detected distance between the auditory organ 8 and the speaker 10 has become longer than the distance preset and stored in a memory section 31, the communication line is disconnected even when a receiver is shifted from the right hand to the left hand by a calling party, for example. In order to avoid the above situation, the signal processing section 13 may be set to disconnect the communication line, without immediately disconnecting the communication line, when the electrical impedance of the speaker 10 stays unchanged for a time equal to or more than a prescribed time, ten seconds for example or when the electrical impedance of the speaker 10 stays longer (or shorter) than the preset threshold value for a time equal to or more than prescribed time, ten seconds for example.

Otherwise, it is preferable that the threshold value as a comparison target for connecting the communication line and the threshold value as a comparison target for disconnecting the communication line are set separately and stored in the memory section 31. For example, if the threshold value for disconnection, which is set as larger than the threshold value for connection (corresponds to long distance), is stored in the memory section 31, malfunctions in the communication line disconnection function such that the communication line is disconnected even when a receiver is shifted from the one hand to the other hand, are preferably reduced. The threshold value stored in the memory section 31 may be adjustable by a telephone call receiver or a telephone call transmitter.

Although a human voice is natural to be employed for the sound transmitted from the speaker 10, a ringing tone for informing the arrival of a telephone call is suitable and an exclusive tone for measuring distance is also suitable.

Although piezoelectric elements typified by PZT and moving coil-type elements typified by a voice coil are suitable for the speaker 10 of a telephone, electrostatic type elements typified by condenser-type elements may also be employed.

Figure 4A:
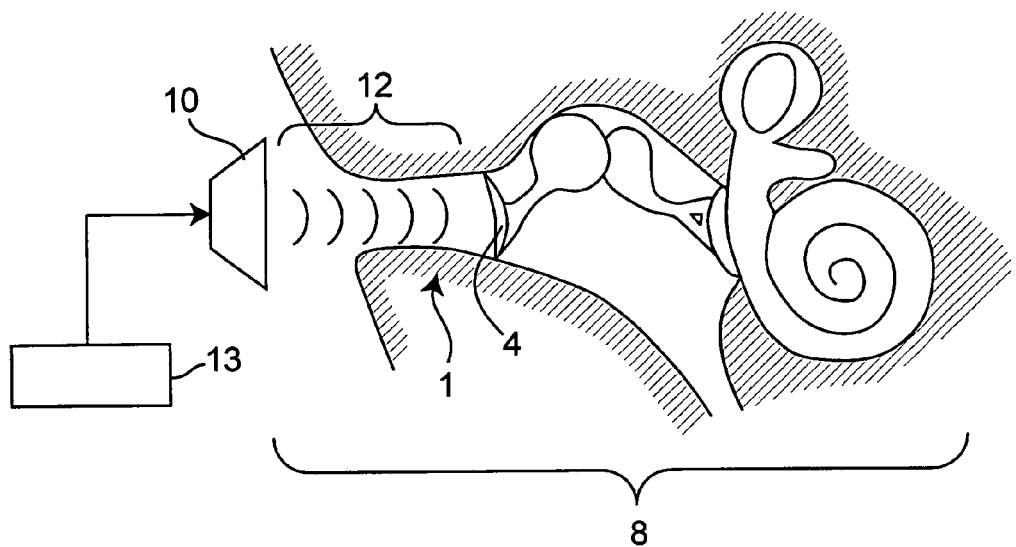
FIG. 4A and FIG. 4B are schematic diagrams showing the measurement of acoustic characteristic information by the communication line connection device of the first embodiment of the present invention.
Figure 4B:
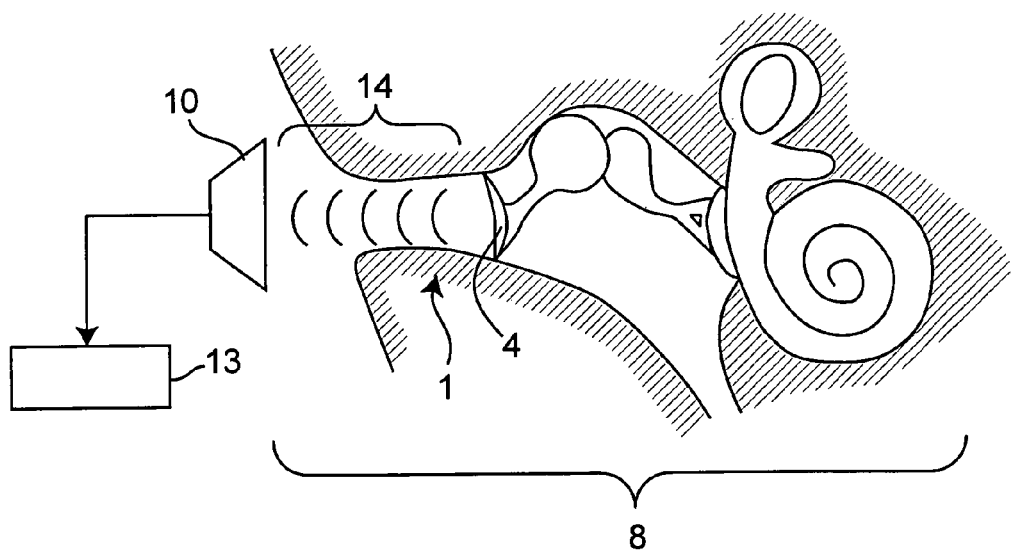

FIG. 4A and FIG. 4B are schematic diagrams showing the measurement of acoustic characteristic information. FIG. 4A is a schematic diagram of the case in which sound is transmitted, and FIG. 4B is a schematic diagram of the case in which sound is received, respectively. In FIG. 4A and FIG. 4B, reference numeral 8 denotes the auditory organ, 10 denotes the speaker, 12 denotes transmitted sound, 13 denotes the signal processing section, and 14 denotes reflected sound.

As shown in FIG. 4A, under control of the signal processing section 13, the sound 12 transmitted from the speaker 10 advances in the external ear 1 of the auditory organ 8. Part of the transmitted sound is absorbed in the auditory organ 8, but the rest is reflected by the respective regions in the auditory organ 8, the eardrum 4 in particular, and the reflected sound 14 is received by the speaker 10 through the external ear 1.

The sound received by the speaker 10 is converted into electrical signals by the speaker 10 (specifically, a piezoelectric element or a voice coil or the like) and operated in the signal processing section 13 so that the distances from the speaker 10 up to the respective regions in the auditory organ 8, the eardrum 4 in particular, are detected based on the transmission time of the transmitted sound 12 and the receipt time of the reflected sound 14. When the signal processing section 13 determines that the obtained distance by detecting has become shorter than a distance preset and stored in the memory section 31, the telephone communication line is connected by the communication line connection/disconnection section 32.

As described above, the communication line is easily connected by utilizing the reflective wave characteristics of the auditory organ 8, but the description will be given for the case in which a communication line is disconnected hereinafter.

If the signal processing section 13 is set to disconnect the communication line immediately when the signal processing section 13 determines that the detected distance between the auditory organ 8 and the speaker 10 has become longer than a preset distance, the communication line is disconnected even when a receiver is shifted from the right hand to the left hand by a calling party, for example. In order to avoid the above situation, a communication line may be set to disconnected, without immediately disconnecting the communication line, when a state where the detected distance becomes longer than the preset distance stays for a time equal to or longer than a prescribed time, ten seconds for example.

When the reflected sound (reflective wave) 14 is employed as described above, a high-frequency acoustic wave is suitable to improve resolution. Roughly estimating with specific numbers, for example, when sound having a frequency of 1 MHz is used, assuming that velocity of sound in air is 300 m/s for simplicity, and when the wavelength is about 0.3 mm and the reciprocation distance from the inlet of the external ear 1 to the eardrum 4 is set to about 6 cm, the time required for reciprocating becomes 200 µs. Since the cycle of sound having a frequency of 1 MHz is 1 µs, when the length of the transmitted sound is set to several cycles to tens of cycles, reflective waves such as the reflective wave from the eardrum 4, the reflective wave from the auditory ossicle 5, and the reflective wave from the cochlea 7 are made possible to be received on a time base separately with the result that the accuracy of the positioning operation of the auditory organ 8 can be improved.

Although FIG. 4A and FIG. 4B give their descriptions based on the case in which the speaker 10 has two functions of sound transmission and reception, a sound transmitter and a sound receiver may be separately provided instead of the speaker 10.

Although piezoelectric elements typified by PZT and moving coil-type elements typified by a voice coil are suitable for structuring the speaker 10, electrostatic type elements typified by condenser-type elements may also be employed.

The method in which a communication line is connected or disconnected by utilizing acoustic characteristic information can be implemented by a software program, which may be saved in a recording medium and stored in the memory section 31 from the recording medium, and is then read from the memory section 31 into the signal processing section 13 to be executed as required or otherwise the software program may externally be downloaded as required by a communication means of some kind such as wireless communication and the Internet to be read into the signal processing section 13 for execution.

This embodiment will more specifically describe the process using a block diagram and a flow diagram, in which a telephone call receiver receives a telephone call and then connects a communication line, or otherwise a telephone call transmitter connects a communication line so that the telephone call receiver itself can transmit, and the communication line is then disconnected after the end of the telephone call.

FIG. 5 shows a schematic diagram of the communication line connection device. In FIG. 5, reference numeral 8 denotes the auditory organ, 10 denotes the speaker, 13 denotes the signal processing section, 31 denotes the memory section, and 32 denotes the communication line connection/disconnection section, respectively.

The signal processing section 13 measures the acoustic characteristic information of the auditory organ 8 of a telephone call receiver or a telephone call transmitter typified by the change in the electrical impedance and the reflective wave properties of the speaker 10 so as to store the information in the memory section 31. A preset threshold value information is stored in the memory section 31, and the signal processing section 13 reads the acoustic characteristic information of the auditory organ of the telephone call receiver or the telephone call transmitter and the threshold value information from the memory section 31 to compare the informations with each other. When it is determined that the speaker 10 has come sufficiently close to the auditory organ 8 as a result of the comparison, the signal processing section 13 orders the communication line connection/disconnection section 32 to connect a communication line.

Once the communication line is connected, the signal processing section 13 continuously measures acoustic characteristic information and compares the acoustic characteristic information with the threshold value information stored in the memory section 31 for disconnecting the communication line. When it is determined that the speaker 10 is far away from the auditory organ 8 as a result of the comparison, the signal processing section 13 orders the communication line connection/disconnection section 32 to disconnect the communication line.

Next, the signal processing flow conducted by the signal processing section 13 will be described using the flow diagram shown in FIG. 6.

When it is detected that a telephone call is received (Step S1), the signal processing section 13 measures the acoustic characteristic information of the auditory organ of a telephone call receiver or a telephone call transmitter (Step S2). The signal processing section 13 then obtains the distance between the auditory organ 8 and the speaker 10 based on this acoustic characteristic information (Step S3).

Next, the signal processing section 13 reads the threshold value information stored in the memory section 31, and then compares the distance obtained in the previous step and the stored threshold value (Step S4). When the measured distance here is shorter than the threshold value, the signal processing section 13 orders the communication line to be connected (Step S5). In contrast, when the measured distance is longer than the threshold value, the signal processing section 13 returns to Step S2 and orders the acoustic characteristic information of the auditory organ of the telephone call receiver or the telephone call transmitter to be measured again. This loop (Steps S2–S4) is repeated until the measured distance becomes shorter than the threshold value.

The communication line is connected through the above operations.

Next, a description will be given for the case in which a communication line is disconnected.

After the connection of the communication line (Step S5), even in the midst of the call by the telephone call receiver or the telephone call transmitter, the signal processing section 13 measures the acoustic characteristic information of the auditory organ of the telephone call receiver or the telephone call transmitter (Step S6). The signal processing section 13 then obtains the distance between the auditory organ 8 and the speaker 10 based on this acoustic characteristic information (Step S7). The signal processing section 13 reads the threshold value information stored in the memory section 31, and then compares the measured distance with the threshold value stored in the memory section 31 to determine whether or not the measured distance is longer than the threshold value stored in the memory section 31 (Step S8). When the measured distance is longer than the threshold value, the signal processing section 13 orders the communication line to be disconnected (Step S9). In contrast, when the measured distance is shorter than the threshold value, the signal processing section 13 returns to Step S6 and orders the acoustic characteristic information of the auditory organ of the telephone call receiver or the telephone call transmitter to be measured again. This loop (Steps S6–S8) is repeated until the measured distance becomes longer than the threshold value.

The communication line is finally disconnected through the above operations.

Figure 6:
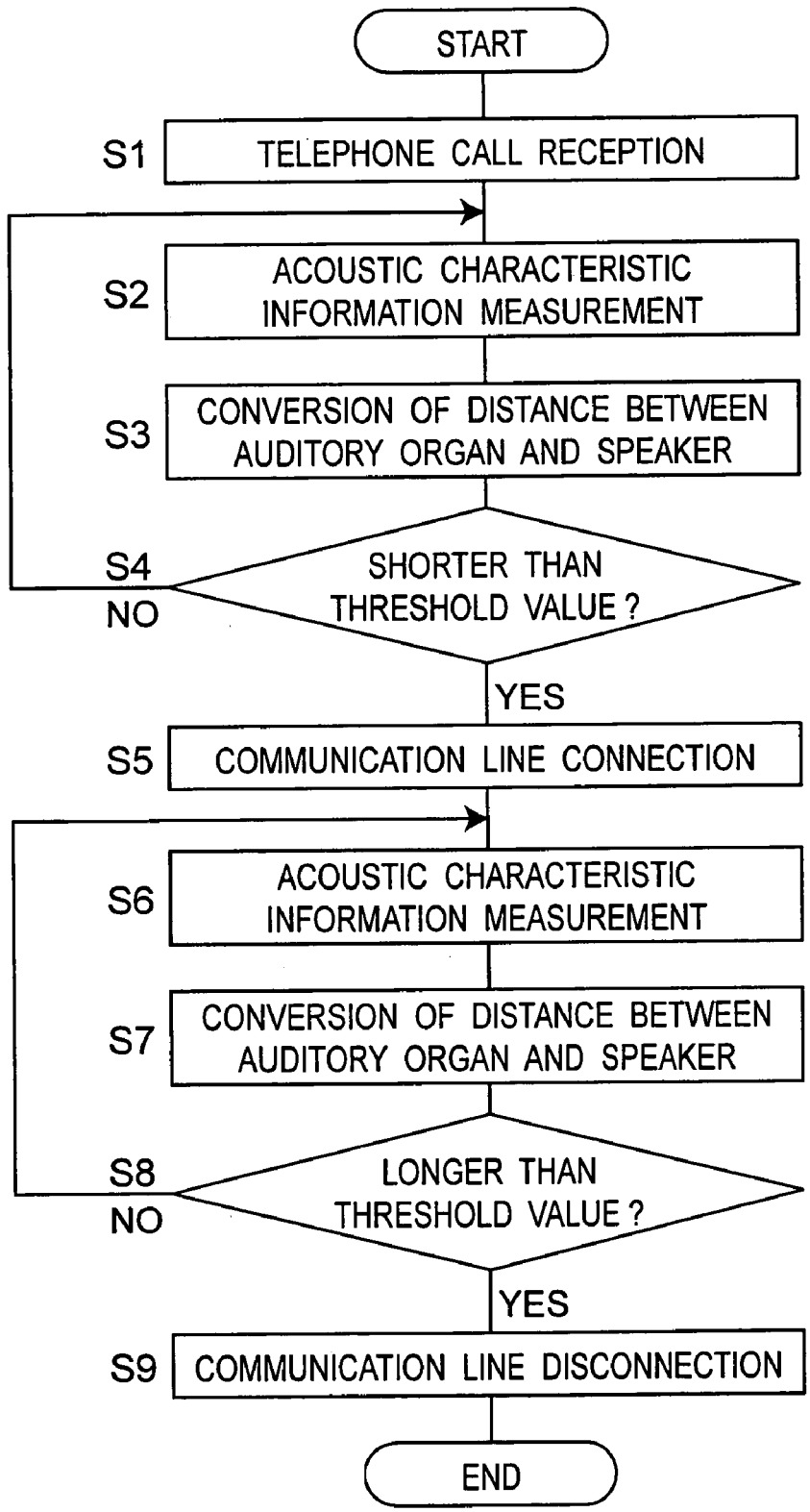
FIG. 6 shows a flow chart up to communication line connection by the communication line connection device of the first embodiment of the present invention.

Although the step in which the distance between the auditory organ 8 and the speaker 10 is obtained based on acoustic characteristic information is described in the flow chart of FIG. 6, it is suitable for the acoustic characteristic information to be directly employed for a comparison parameter instead of obtaining distance from the acoustic characteristic information as described above, in which case Steps S3 and S7 for distance calculation may be omitted.

Also, it is preferable that the threshold value as a comparison target for connecting the communication line and the threshold value as a comparison target for disconnecting the communication line are set separately and stored in the memory section 31. For example, if the threshold value for disconnection, which is set as larger than the threshold value for connection (corresponds to long distance), is stored in the memory section 31, malfunctions in the communication line disconnection function such that the communication line is disconnected even when a receiver is shifted from the one hand to the other hand, are preferably reduced. It is to be noted that the threshold value stored in the memory section 31 may be adjustable by the telephone call receiver or the telephone call transmitter.

The first embodiment thus focuses on measuring the acoustic characteristics of the auditory organ 8 of the telephone call receiver and the telephone call transmitter, and finds the application thereof to the connection or disconnection of the communication line by the receiver. That is, by using the acoustic impedance of the auditory organ 8 in order to employ a judgment criterion which considers the structure and materials inside a living body as well, a concise communication line connection/disconnection method can be achieved by detecting the distance between the auditory organ 8 and a sound transmission and reception section, for example the speaker 10, to determine whether the detected distance is longer than a prescribed distance (or the detected impedance is larger than a prescribed impedance). Therefore, the call operation of the call control device of a telephone can be easily controlled with very high recognizing accuracy using the auditory organ 8, which every human has, instead of using a complex mechanism component.

The present invention is not limited to the above embodiment and is applicable to other various embodiments as follows.

SECOND EMBODIMENT

The above described technology which detects the distance between the auditory organ and the receiver using the acoustic characteristics of the auditory organ of the telephone call receiver and the telephone call transmitter is suitably employed for the call operation control conducted when the communication line is connected or disconnected at the time of call reception, other than the call operation control conducted when the communication line is connected or disconnected at the time of call transmission.

The second embodiment of the present invention describes the process by reference to a block diagram and a flow chart, in which a telephone call transmitter transmits a telephone call and a communication line is disconnected after the end of the telephone call with the use of dial operation using voice recognition technology. Voice recognition technology, which is employed when a device is operated by voice instead of using mechanism components such as a button, shows close coordination with the present invention.

Figure 9:
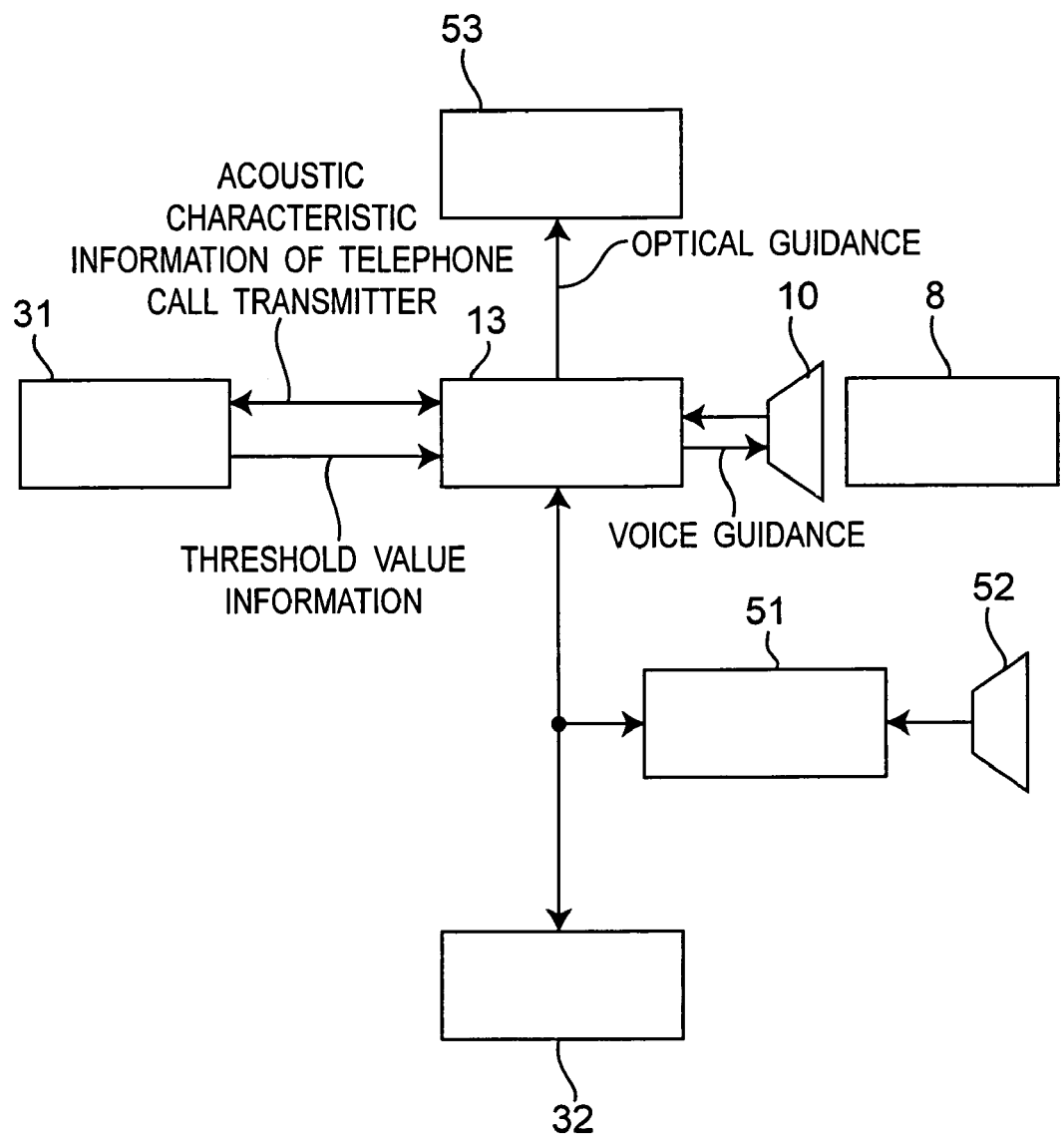
FIG. 9 shows a schematic diagram of a call control device of a second embodiment of the present invention.

FIG. 9 shows a schematic diagram of a call control device according to the second embodiment of the present invention. In FIG. 9, reference numeral 8 denotes an auditory organ, 10 denotes a speaker, 13 denotes a signal processing section, 31 denotes a memory section, 51 a voice recognition control section for recognizing voice to control call-related operation, 32 denotes a communication line connection/disconnection section, 52 denotes a microphone, and 53 denotes an illumination device, respectively.

The signal processing section 13 measures the acoustic characteristic information of the auditory organ 8 of a telephone call transmitter typified by the electrical impedance of the speaker 10, and stores the information in the memory section 31. Preset threshold value information is stored in the memory section 31, and the signal processing section 13 reads the distance between auditory organ 8 of the telephone call transmitter and the speaker 10, and the threshold value information from the memory section 31, to compare the distance with the information by the signal processing section 13. When it is determined that the speaker 10 has come sufficiently close to the auditory organ 8 (in other words, when the distance between the speaker 10 and the auditory organ 8 is determined to be equal to or shorter than the preset value) as a result of the comparison, the signal processing section 13 orders the voice recognition control section 51 to start voice recognition. At the same time, the signal processing section 13 tells the telephone call transmitter that the voice recognition starts using the speaker 10 by voice (voice guidance) or tells by changing the luminescent color, emission intensity, or emission timing of light using the illumination device 53 (optical guidance).

The voice guidance specifically contains call-related operations such as urging the telephone call transmitter to vocalize the name and the telephone number (figures) of the other party of a call, telling the result of voice recognition to the telephone call transmitter, urging the telephone call transmitter to choose from several options. The optical guidance specifically contains call-related operations such as a green light emitted when the telephone call transmitter is urged to vocalize the name and the telephone number (figures) of the other party of a call, a blue light emitted when the voice recognition has been successful and a red light emitted when the voice recognition has failed, in the example in which the luminescent color is used. In the example in which the light emission timing is used, call-related operations can be conducted such as providing various informations to the telephone call transmitter by flashing frequency and number of flashing times of light emission. Furthermore, the combination of the luminescent color, emission intensity, and emission timing of light can produce a communication means which the telephone call transmitter can easily recognize. A display or a numeric keypad mounted with a receiver is suitably used as the illumination device 53, but a device exclusively for light emission may be mounted with a receiver. There are also other methods such as the method which uses a vibrator mounted with a receiver to communicate with the telephone call transmitter by vibration.

When the other party of a call is decided by voice recognition, the signal processing section 13 orders the communication line connection/disconnection section 32 to dial the number of the relevant party of the call.

Once a communication line is connected, the signal processing section 13 measures and stores acoustic characteristic information to disconnect the communication line, as well as converts the distance between the auditory organ 8 and the speaker 10 to store the converted distance in the memory section 31 based on the stored acoustic characteristic information.

The distance between the auditory organ 8 and the speaker 10 read from the memory section 31 and the threshold value information stored in the memory section 31 are compared with each other. When it is determined that the threshold value information is longer than the distance and that the speaker 10 is far away from the auditory organ 8 as a result of the comparison, the signal processing section 13 orders the communication line connection/disconnection section 32- to disconnect the communication line.

On the other hand, when it is determined that the threshold value information is equal to or shorter than the distance and that the speaker 10 is not far away from the auditory organ 8, the distance between the auditory organ 8 and the speaker 10 is again obtained based on acoustic characteristic information, the signal processing section 13 measures and stores acoustic characteristic information to disconnect the communication line, as well as converts the distance between the auditory organ 8 and the speaker 10 to store the converted distance in the memory section 31 based on the stored acoustic characteristic information. The distance between the auditory organ 8 and the speaker 10 read from the memory section 31 and the threshold value information stored in the memory section 31 are then compared with each other. This loop continues until it is determined that the speaker 10 is far away from the auditory organ 8 with the result that the communication line is disconnected.

Next, the signal processing flow conducted by the signal processing section 13 will be described using the flow diagram shown in FIG. 10.

Figure 10:
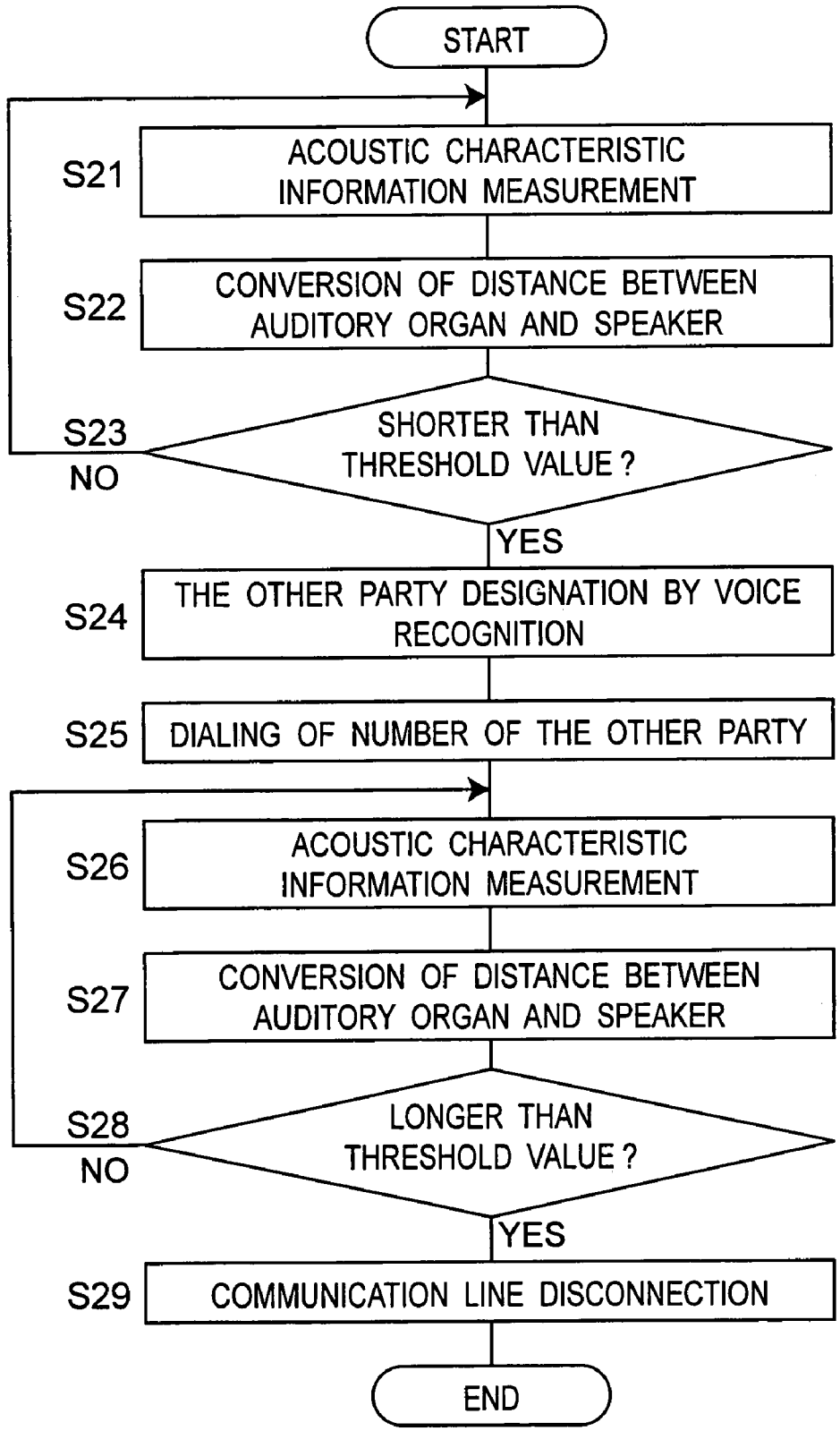
FIG. 10 shows a flow chart of the call control operation by the call control device of the second embodiment of the present invention.

The signal processing section 13 measures the acoustic characteristic information of the auditory organ of a telephone call transmitter through the acoustic characteristic information of the speaker 10 (Step S21 of FIG. 10). The signal processing section 13 then obtains the distance between the auditory organ 8 and the speaker 10 based on the acoustic characteristic information (Step S22 of FIG. 10). Then, the signal processing section 13 reads the threshold value information stored in the memory section 31 to compare the information with the distance obtained in the previous step (Step S23 of FIG. 10). When the distance measured, here is shorter than the threshold value, the signal processing section 13 orders voice recognition to get started (Step S24 of FIG. 10). When the other party of a call is decided by voice recognition, the signal processing section 13 orders the number of the other party of a call to be dialed (Step S25 of FIG. 10). On the hand, when the measured distance is longer than the threshold value, the signal processing section 13 orders the acoustic characteristic information of the auditory organ of the telephone call transmitter to be measured again (Step S21 of FIG. 10). This loop (Steps S21–S23 of FIG. 10) is repeated until the measured distance becomes shorter than the threshold value.

Next, a description will be given for the case in which a communication line is disconnected. After the connection of the communication line, even in the midst of the call by a telephone call transmitter, the signal processing section 13 measures the acoustic characteristic information of the auditory organ of the telephone call transmitter (Step S26 of FIG. 10). The signal processing section 13 then obtains the distance between the auditory organ 8 and the speaker 10 from the acoustic characteristic information (Step S27 of FIG. 10). Then, the signal processing section 13 reads the threshold value information stored in the memory section 31 to compare the information with the distance obtained in the previous step (Step S28 of FIG. 10). When the measured distance is longer than the threshold value, the signal processing section 13 orders the communication line to be disconnected (Step S29 of FIG. 10). On the hand, when the measured distance is shorter than the threshold value, the signal processing section 13 orders the acoustic characteristic information of the auditory organ of the telephone call transmitter to be measured again (Step S26 of FIG. 10). This loop (Steps S26–S28 of FIG. 10) is repeated until the measured distance becomes longer than the threshold value. The communication line is finally disconnected through the above operations.

Although Steps S22 and S27 are described in the flow diagram of FIG. 10, in which the distance between the auditory organ 8 and the speaker 10 is obtained based on acoustic characteristic information, it is also suitable for the acoustic characteristic information to be directly employed for a comparison parameter instead of obtaining distance from the acoustic characteristic information as described above, in which case Steps S22 and S27 for distance conversion may be omitted.

Also, it is also suitable that the threshold value as a comparison target for connecting the communication line and the threshold value as a comparison target for disconnecting the communication line are set separately and stored in the memory section 31. For example, if the threshold value for disconnection, which is set as larger than the threshold value for connection (corresponds to long distance), is stored in the memory section 31, malfunctions in the line disconnection function such that the communication line is disconnected even when a receiver is shifted from the one hand to the other hand, are preferably reduced.

The present invention thus focuses on measuring the acoustic characteristics of the auditory organ of the telephone call transmitter and the telephone call receiver, and finds the application thereof to connection and disconnection of the communication line by the receiver. That is, by using the acoustic impedance of the auditory organ in order to employ a judgment criterion which considers the structure and materials inside a living body as well, a concise communication line connection/disconnection method can be achieved by detecting the distance between the auditory organ and a sound transmission and reception section, for example the speaker, to determine whether or not the detected distance is longer than a prescribed distance (or the detected impedance is larger than a prescribed impedance). Therefore, this invention easily controls the operation of the call control device of a telephone with very high recognition accuracy using the auditory organ, which every human has, instead of using a complex mechanism component, and has the beneficial effect which allows a concise communication line connection/disconnection method to be achieved by detecting the distance between the auditory organ and the sound transmitting and receiving part.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A call control method comprising of:
   transmitting sound from a sound transmission and reception section of a call control device and receiving the sound in the sound transmission and reception section;
   detecting bioacoustic characteristic information of an auditory organ of a telephone call receiver or a telephone call transmitter by the received sound; and
   controlling call operation of the call control device based on the detected bioacoustic characteristic information.

2. The call control method as set forth in claim 1, comprising of:
   detecting a distance between the auditory organ of the telephone call receiver or the telephone call transmitter and the sound transmission and reception section of the call control device based on the detected bioacoustic characteristic information; and
   controlling the operation to connect or disconnect a communication line by the call control device based on the detected distance.

3. The call control method as set forth in claim 1, wherein the bioacoustic characteristic information of the auditory organ is a total acoustic impedance of an acoustic impedance of an external ear, an acoustic impedance of a middle ear, and an acoustic impedance of an internal ear of an operator of the call control device.

4. The call control method as set forth in claim 1, wherein time information as well as the bioacoustic characteristic information or the distance information are detected and the communication line is connected or disconnected based on the detected bioacoustic characteristic information or distance information and the time information.

5. The call control method as set forth in claim 1, wherein when the call operation control of the call control device is performed based on the detected bioacoustic characteristic information, voice recognition operation is controlled based on the detected bioacoustic characteristic information, as well as the communication line is connected or disconnected, and call-related operation is conducted through the voice recognition operation.

6. A call control device comprising:
   a sound transmission and reception part for transmitting and receiving sound; and
   a bioacoustic characteristic information detection means for detecting bioacoustic characteristic information of the auditory organ of the operator of the call control device by the sound transmitted and received by the sound transmission and reception part,
   wherein call operation is controlled based on the bioacoustic characteristic information detected by the bioacoustic characteristic information detection means.

7. The call control device as set forth in claim 6, further comprising a means for detecting a distance between the auditory organ and the transmission and reception section by comparing the acoustic characteristic information detected by the bioacoustic characteristic information detection means and a preliminarily obtained threshold value,
   wherein the communication line is connected and/or disconnected according to the detected distance.

8. The call control device as set forth in claim 6, wherein the transmission and reception section is a speaker; and
   the bioacoustic characteristic information detection means is a signal processing section for signal-processing the sound information received and transmitted by the speaker to detect the bioacoustic characteristic information of the auditory organ of the operator of the call control device,
   further comprising a distance detection means for detecting the distance between the auditory organ of the telephone call receiver or the telephone call transmitter and the speaker based on the detected bioacoustic characteristic information,
   wherein the call operation is controlled based on the distance detected by the distance detection means.

9. The call control device as set forth in claim 6, wherein the transmission and reception section is composed of a piezoelectric element.

10. The call control device as set forth in claim 6, wherein the transmission and reception section is composed of a voice coil.

11. The call control device as set forth in claim 6, further comprising a voice recognition control section for controlling call-related operation by voice recognition,
    wherein when the distance between the transmission and reception section and the auditory organ is determined to be equal to or shorter than a preset value by the bioacoustic characteristic information detection means, voice recognition operation is started in the voice recognition control section to control the call-related operation.

* * * * *